United States Patent
Willard (10) Patent No.: US 9,641,738 B1
(45) Date of Patent: May 2, 2017

(54) UNIVERSAL DEVICE MANAGEMENT AND CONTROL

(71) Applicant: Shield Aviation, Inc, San Diego, CA (US)

(72) Inventor: Richard S. Willard, San Diego, CA (US)

(73) Assignee: Shield Aviation, Inc., San Diego, CA (US)

( * ) Notice: Subject to any disclaimer, the term of this patent is extended or adjusted under 35 U.S.C. 154(b) by 0 days.

(21) Appl. No.: 14/958,774

(22) Filed: Dec. 3, 2015

(51) Int. Cl.
*H04N 5/232* (2006.01)
*H04N 7/18* (2006.01)

(52) U.S. Cl.
CPC ......... *H04N 5/23206* (2013.01); *H04N 7/181* (2013.01)

(58) Field of Classification Search
CPC ............................ H04N 5/23206; H04N 7/181
See application file for complete search history.

(56) References Cited

U.S. PATENT DOCUMENTS

| | | | |
|---|---|---|---|
| 2010/0190480 A1* | 7/2010 | Zheng | G08B 13/19621 455/414.1 |
| 2014/0320662 A1* | 10/2014 | McNamee | H04N 7/181 348/159 |

* cited by examiner

*Primary Examiner* — Twyler Haskins
*Assistant Examiner* — Angel L Garces-Rivera
(74) *Attorney, Agent, or Firm* — Lewis Roca Rothgerber Christie LLP (57) ABSTRACT

Systems and methods for universal device management of one or more imaging devices using a common controller are described. The systems and methods are directed at storing information for each imaging device in a memory of a processor. The processor receives unformatted instructions (or user input) from the controller and processes the unformatted instructions into instructions that can be recognized by the particular imaging device. In this way, a single controller can be used to communicate with a plurality of different imaging devices that each may have their own distinct payload format.

12 Claims, 9 Drawing Sheets

FIGURE 7D ns and methods directed at universal device management and control so that an individual is capable of controlling the various available imaging devices without the need to learn the particular intricacies tied to each device. The systems and methods may also be directed at universal device management and control that can fully and effectively control a particular device. The systems and methods may also be directed at providing a stable communication between the controller and corresponding imaging devices. As such, embodiments of the present invention include a simple, intuitive human interface to manage multiple imaging systems, universal in terms of manufacturer and model. This universal control interface is implemented as a software application on common computers and presents an organized, modular graphic user interface (GUI) to the operator.

UNIVERSAL DEVICE MANAGEMENT AND CONTROL

BACKGROUND

1. Field of the Invention

The present invention generally relates to device management and control. More specifically, the present invention relates to universal device management and control in aerial systems.

2. Description of the Related Art

Presently available are aerial systems that include one or more imaging devices that have specialized sensors or cameras (e.g., forward looking infrared cameras (FUR)). These imaging devices may be used by civilians and military for a variety of purposes such as for surveillance and mapping. In other words, these imaging devices may provide an opportunity for individuals to perform telemetry, as well as general observation of surrounding environments, from a remote location using such imaging devices.

It should be noted that there are a variety of such imaging devices available on the market. These imaging devices may be manufactured by many different companies. These imaging devices may be complex and expensive not only during manufacturing of the imaging devices but also in training individuals to manage and control such imaging devices. For example, many of these imaging devices utilize a system (e.g., Gimbal) to facilitate the control of the imaging device. In particular, the Gimbal system can be used to control the operation and positioning of the imaging devices (e.g., rotate) so that an appropriate image or measurement is obtained.

A problem arises from the various different available imaging devices. In particular, each manufacturer may address different features in managing and controlling their respective imaging devices differently. For example, one company may use one algorithm to dictate how their imaging device respond to instructions related to "cage" and "stow." Another company, meanwhile, may use a different algorithm or may even use different terminology to refer to similar instructions. It is not farfetched that such instructions may be customized for each respective imaging device to take into consideration the specification and desired purpose of that particular respective imaging device.

In view of the above, there appears to be no current standard for controlling all the imaging devices available. As noted above, it appears that each manufacturer designs their imaging devices and a corresponding controller for that particular imaging device. This may lead to situations where one controller is not compatible with another different imaging device since the manufacturer may need to customize their controller to be responsive to their respective complex imaging device. This may also lead to other situations where an individual may need to be trained to use two or more different controllers when assigned to control two or more different imaging devices.

Additionally, ability to the control a particular imaging device may be limited to the associated features implemented in the controller at the time the controller was manufactured. In other words, newer versions of the imaging device and/or new functionalities incorporated into the same imaging device previously not incorporated in the original controller design may not be compatible with the original controller design. This problem is compounded since the ground controllers exist as hand-held hardware devices that have fixed switches, buttons, and knobs that are assigned to manage image system functionality. The hardware layout and labels are unique for a given manufacturer, and variants of the hand-held devices exist for a given imaging system.

In view of the above, there is a need in the art for systems and methods directed at universal device management and control so that an individual is capable of controlling the various available imaging devices without the need to learn the particular intricacies tied to each device. The systems and methods may also be directed at universal device management and control that can fully and effectively control a particular device. The systems and methods may also be directed at providing a stable communication between the controller and corresponding imaging devices. As such, embodiments of the present invention include a simple, intuitive human interface to manage multiple imaging systems, universal in terms of manufacturer and model. This universal control interface is implemented as a software application on common computers and presents an organized, modular graphic user interface (GUI) to the operator.

SUMMARY OF THE CLAIMED INVENTION

A method for universal device management of a plurality of imaging devices is claimed. The method includes the steps of storing information in memory associated with a processor whereby the stored information is a set of operational settings specific to each imaging device. The processor receives unformatted instructions from a controller for a particular imaging device. The unformatted instructions are for managing or controlling the imaging device and correspond to user input from the controller. The processor can then identify the imaging device in question and retrieve the corresponding set of operational settings associated with the imaging device. The set of operational settings are used by the processor to process the unformatted instructions into instructions that the imaging device can understand. The formatted instructions are then provided to the imaging device to control and manage the imaging device based on the instructions provided by the user via the controller.

A system for universal device management of a plurality of imaging devices is claimed. The system includes a plurality of imaging devices whereby each of the imaging devices may have a distinct payload format that differs from other imaging devices. The system also includes a controller whereby a user provides user inputs for managing or controlling the imaging devices. Lastly, the system includes a process that includes memory that stores information regarding the plurality of imaging devices whereby the stored information is a set of operational settings specific to each imaging device. The processor receives unformatted instructions from a controller for a particular imaging device. The unformatted instructions are for managing or controlling the imaging device and correspond to user input from the controller. The processor can then identify the imaging device in question and retrieve the corresponding set of operational settings associated with the imaging device. The set of operational settings are used by the processor to process the unformatted instructions into instructions that the imaging device can understand. The formatted instructions are then provided to the imaging device to control and manage the imaging device based on the instructions provided by the user via the controller.

A non-transitory computer-readable storage medium that includes a program executable by a processor to perform the method for universal device management of a plurality of imaging devices is claimed. The method includes the steps of storing information in memory associated with a processor whereby the stored information is a set of operational settings specific to each imaging device. The processor receives unformatted instructions from a controller for a particular imaging device. The unformatted instructions are for managing or controlling the imaging device and correspond to user input from the controller. The processor can then identify the imaging device in question and retrieve the corresponding set of operational settings associated with the imaging device. The set of operational settings are used by the processor to process the unformatted instructions into instructions that the imaging device can understand. The formatted instructions are then provided to the imaging device to control and manage the imaging device based on the instructions provided by the user via the controller.

BRIEF DESCRIPTION OF THE FIGURES

A more complete understanding of the present invention may be obtained by reference of the following detailed description when taken in conjunction with the accompany figures.

FIG. 6 illustrates further exemplary GUI, showing different elements that a user can interact with.

DETAILED DESCRIPTION

In various embodiments, the systems and methods described herein facilitates user control of one or more imaging devices using a single controller. The imaging devices are controlled in a remote IP (internet protocol) based environment. Even though each imaging device may have their own distinct features and instructions specific to the control, management, and operation of the imaging device, the single controller consolidates each different imaging device so that a user can learn one interface and control the different imaging devices without further effort. Using the single controller, additional features may also be implemented that were not previously capable of being controlled in a single controller (e.g., power cycle, set fail safe, add/modify recovery scenarios).

Figure 1:
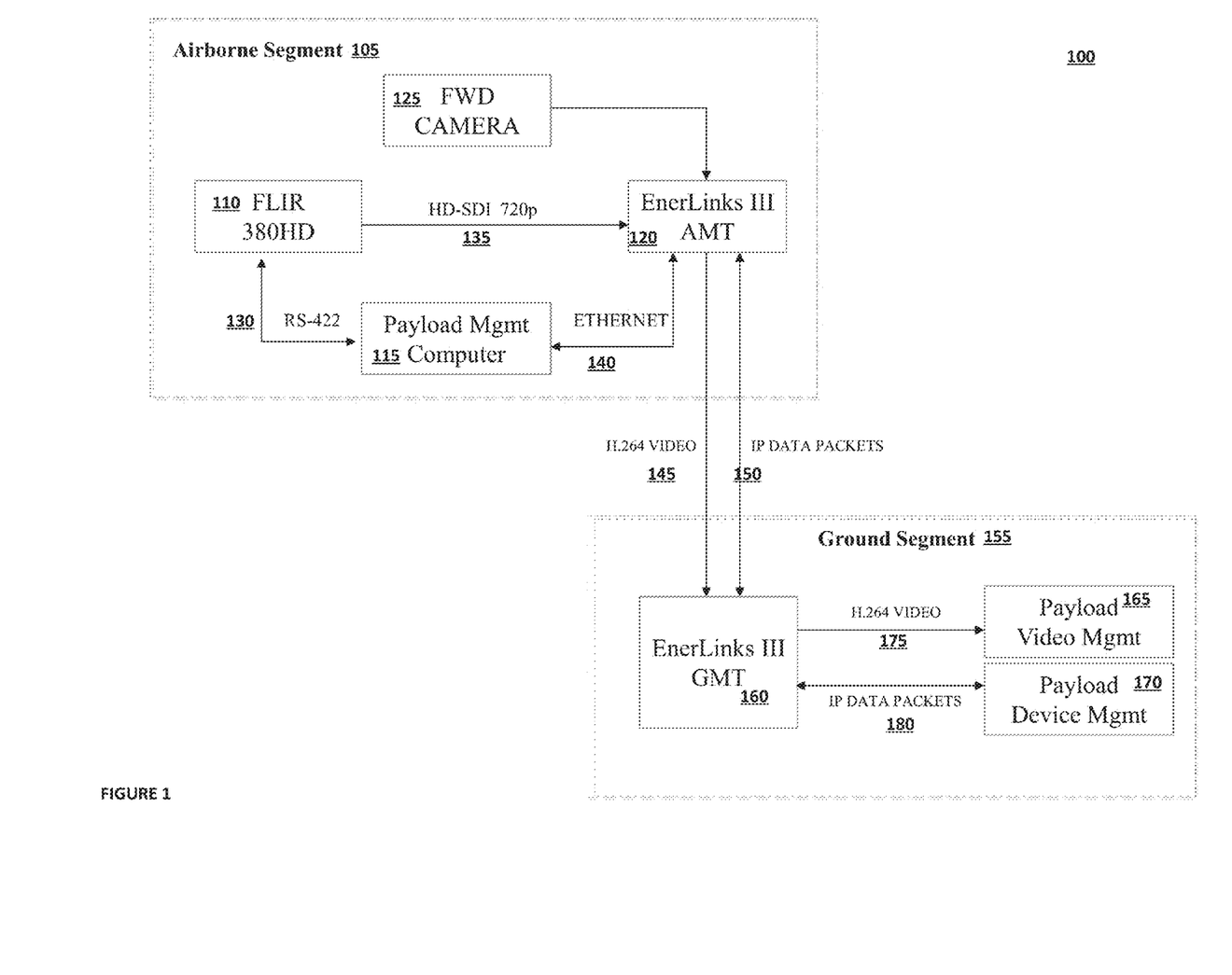
FIG. 1 illustrates a universal device management system.

FIG. 1 illustrates an universal device management system (UDMS) 100. As noted above, the UDMS 100 is designed to integrate multiple different imaging devices in a remote IP based environment. A wide range of imaging devices can be controlled simultaneously through the remote interface. Even though FIG. 1 illustrates a single imaging device (e.g., FLIR 380HD 110), embodiments described herein are capable of controlling more than one imaging device. The plurality of imaging devices may be within the same airborne segment 105 or over different airborne segments.

As illustrated in FIG. 1, the UDMS 100 includes an airborne segment 105 and a ground segment 155 whereby an individual using the ground segment 155 can manage and control the imaging device(s) 110 included on the airborne segment 105. The airborne segment 105 can, for example, correspond to an aircraft (manned or unmanned) that includes one or more imaging devices. The airborne segment 105 can also include different apparatus (e.g., a pod) inclusive of one or more imaging devices that are attached to an aircraft.

Airborne segments 105 that have imaging devices 110 can be used for a variety of different reasons. For example, police may use imaging devices 110 on airborne segments 105 for surveillance. Imaging devices 110 on airborne segments 105 may also be used for purposes of capturing images for news organizations.

The ground segment 155 is capable of controlling one or more imaging devices 110 found in one or more air segments 105. An exemplary ground segment 155 may be a terminal (e.g., a computer). The terminal (also referred to as a controller) may be programmed so that a single user can control and manage different airborne segments 105 and/or different imaging devices 110. The terminal may also be updated to include additional control for newer airborne segments 105 and/or newer imaging devices 110. In this way, the single user can learn how to control different airborne segments 105 and different imaging devices 110 using a standardized terminal. This is an advantage from past methods whereby different airborne segments 105 and different imaging devices 110 may have had their own unique terminal. Complications may arise when a user needs to learn different terminals for different airborne segments or different imaging devices.

As illustrated in FIG. 1, the airborne segment 105 includes a plurality of different elements. Aside from the imaging device 110 (e.g., FLIR 380HD camera), the airborne segment 105 also includes a payload management computer 115 and an air modem terminal (AMT) 120. The payload management computer 115 includes the various instructions that a user at the ground segment 155 can select and forward to the imaging device 110. These instructions are used for operation of the imaging device 110. The AMT 120, alongside with the ground modem terminal (GMT) 160, serves as connection points between the airborne segment 105 and the ground segment 155 whereby information can be transferred between the airborne segment 105 and the ground segment 155.

In embodiments where the airborne segment 105 is an unmanned airborne vehicle (UAV), a forward camera 125 may be included to facilitate control of the airborne segment 105. For example, the forward camera 125 may provide a user a perspective of the airborne segment 105 that can be used to dictate a path/trajectory for the airborne segment 105. This control of the airborne segment 105 may be provided through the ground segment 155 or from a distinct terminal/controller. Therefore, the forward camera 125 may not be included in all airborne segments 105.

The one or more imaging devices 110 of the airborne segment 105 may include any number of different existing specialized imaging devices 110. For example, as illustrated in FIG. 1, the imaging device 110 may include a forward looking infrared camera (FLIR). Other types of imaging devices are also known and can be used herein as well. Use of a particular imaging device may depend on the intended purpose or the specific features of a particular imaging device. To facilitate remote management and control of the imaging devices 110, systems known as Gimbals may be used alongside the imaging devices 110 or may be integrated with the imaging devices 110. Gimbals are used to control and manage the operation of the imaging device. For example, Gimbals can adjust the positioning of the imaging device 110 or any other feature/parameter of the imaging device 110 (e.g., lens) in order to improve tracking of objects or providing a better view of an area being captured by the imaging device 110. Gimbals may also include one or more sensors to further facilitate operation of the imaging devices. Such sensors may include thermal imaging sensors, laser range finder, illuminators and light sensors.

Control of the Gimbal, and therefore control of the imaging device 110, may be provided indirectly from a user through the use of the payload management computer 115. The user may be associated with the ground segment 155 and provides remote instructions from the payload device management 170 that are picked up by the payload management computer 115. These remote instructions are processed and then forwarded to the appropriate imaging device 110. Instructions provided from the payload management computer 115 to the imaging device 110 may be provided using an RS-422 connection 130. Further details pertaining to the instructions provided by the user associated with the ground segment 155 that can be used to control the Gimbal/imaging device 110 will be provided below.

The payload management computer 115 facilitates remote control of the imaging device 110 by a user associated with the ground segment 155. More specifically, the payload management computer 115 translates/processes remote instructions from the user associated with the ground segment 155 into specific recognizable instructions that are used to control and manage a specific imaging device 110.

As noted above, in the past different imaging devices may each have a unique terminal/controller associated for the control and management of the specific imaging device. The terminals/controllers associated with each different imaging device may not be compatible with other imaging devices. For example, each imaging device may have various different functions and algorithms designed at performing a particular function as intended by a particular manufacturer associated with the imaging device. Since there is no standardization, the different manufacturers can perform (and identify/name) similar actions very differently, which may also lead to further compatibility issues. This incompatibility between terminals/controllers and imaging devices of different manufacturers also causes additional negative impacts such as increased cost of training and operation of the imaging devices. A single individual may be required to be trained for each unique imaging device since managing and controlling each unique imaging device could be drastically different.

With the payload management computer 115, standardization and uniformity for controlling different imaging devices are possible. In particular, the payload management computer 115 takes instructions from the ground segment 155 and processes the remote instructions into recognizable instructions for the associated imaging device 110. Further details pertaining to the graphical user interface (GUI) for user control of the imaging device 110 (via the payload device management 170) are provided below. More specifically, the payload device management 170 may be implemented to standardize the different terminals/controllers for controlling the different imaging devices. The payload management computer 115, however, processes the remote instructions into recognizable instructions for each distinct imaging device 110.

It should be noted that the payload management computer 115 can be associated with one or more imaging devices 110. Control of each of the one or more imaging devices 110 occurs individually. As described in further detail below, the user chooses an imaging device 110 to control. The ground segment 155 forms a communication connection with the payload management computer 115 and the chosen imaging device 110. If other imaging devices exist, the user must disconnect from the originally chosen imaging device 110 in order to select a different imaging device. Subsequently, the user can connect to the new imaging device 110 alongside the payload management computer 115. In this way, the user can control the plurality of different imaging devices 110.

An exemplary payload management computer 115 associated with the airborne segment 110 can have the following parameters. It should be noted that the parameters provided below for the payload management computer 115 may be dependent on the associated airborne segment 110. Therefore parameters for payload management computers 115 for larger or smaller embodiments are also possible.

| Physical Parameters | Dimensions: 3 inches width by 2.75 inches height by 6 inches length |
| --- | --- |
| | Weight: 1.3 pounds |
| | Aluminum extrusion enclosure |
| Power Requirements | 28 VDC MIL-SPEC 704F |

Additional information regarding the operation of the payload management computer 113 can be seen below. In particular, information regarding how instructions are transmitted from the ground segment 120, processed in the payload management computer 113, and then issued to the one or more imaging devices 111 can be seen, for example, in FIGS. 7-8.

With reference to FIG. 1, the AMT 120 facilitates remote communication between the airborne segment 110 and the ground segment 155. As noted above, the AMT 120 and the GMT 160 are a pair of terminals that transmit information (over remote IP) between the airborne segment 110 and the ground segment 155. The AMT 120 serves two roles. First, the AMT 120 acquires the images obtained from the imaging device(s) 110 in the airborne segment 105. The AMT 120 can then process the images so that the information can be sent to the ground segment 155 via the connection with the corresponding GMT 160. The AMT 120 can also receive instructions from the ground segment 155 via the connection with the corresponding GMT 160. The received instructions may be used to control the airborne segment 105 and/or control operation of the imaging device(s) 110. As described above, the received instructions are forwarded to the payload management computer 115 that then processes the received instructions into instructions that the particular imaging device 110 understands.

Information within the airborne segment 105 is transmitted using specific connections. As noted above, a RS-422 connection 130 is used by the payload management computer 115 to transmit processed instructions to the imaging device 110. The payload management computer 115 receives the instructions from the ground segment 155 from the AMT 120. The AMT uses an Ethernet connection 140 to provide the user instructions from the ground segment 155 to the payload management computer 115. Lastly, capture image data obtained from the imaging device(s) 110 are provided to the AMT 120 using a HD SDI 720p connection 135.

As illustrated in FIG. 1, the airborne segment 105 and the ground segment 155 are communicatively connected to each other. More specifically, the AMT 120 of the airborne segment 105 are in communication with the GMT 160 of the ground segment 155. The AMT 120 and the GMT 160 utilize two communication channels to communicate between each other: the H.264 video channel 145 and the IP data packets channel 150. The H.264 video channel 145 is used by the AMT 120 to transmit the captured images taken by the imaging device 110 that are subsequently processed by the AMT 120. The IP data packets channel 150 is used by both the AMT 120 and the GMT 160 to transmit all other information between the airborne segment 105 and the ground segment 155. For example, such information may include user instructions that will be processed by the payload management computer 115 to control the imaging device 110. Information may also be provided by the user from the ground segment 155 used to control the airborne segment 1105 if applicable.

The ground segment 155 can be viewed as the terminal or controller whereby a user interacts with in order to control the various imaging devices 110 of the airborne segment 105. The ground segment 155 may also provide elements that allow the user to view the information (e.g., captured images) being transmitted from the airborne segment 105 to the ground segment 155. As illustrated in FIG. 1, the ground segment 155 includes a number of elements that facilitates the above features. Such elements include the GMT 160, the payload video management 165 and the payload device management 170. It should be noted that the information from the airborne segment 105 is provided to the payload video management 165 from the GMT 160 via a H.264 video channel 175. Meanwhile, the user instructions that are transmitted from the ground segment 155 to the airborne segment 105 are provided from the payload device management 170 to the GMT 160 using the IP data packets channel 180.

As described above, the GMT 160 of the ground segment 155 communicates with the AMT 120 of the airborne segment 105. Information between the GMT 160 and the AMT 120 are communicated between each other using remote IP connections.

The payload video management 165 of the ground segment 165 facilitates the user in processing the image data obtained from the imaging device 110 of the airborne segment 105. The payload video management 165 includes a plurality of different applications/programs/libraries that could be utilized. Further descriptions of the available features of the payload video management 165 are provided below in FIG. 2.

The payload device management 170 of the ground segment 165 facilitates the user instructions directed at controlling the imaging device 110 and/or the airborne segment 105. Similar to the payload video management 165, the payload device management 170 may also include a plurality of applications/programs/libraries that can be transmitted to the airborne segment 105. Further descriptions of the available features of the payload device management 170 are provided below in FIG. 3.

The instructions for controlling the airborne segment 105 may be provided directly to the airborne segment 105 for control of the airborne segment 105. The instructions to control the imaging devices 110, however, would need to be transmitted to the payload management computer 115 found on the airborne segment 105. Through the use of the payload management computer 115, the instructions provided from the payload device management 170 can be processed into instructions that would be recognizable by the imaging device 110.

As noted above, the ground segment 155 (in particular the payload device management 170), is adapted to be standardized/uniform in allowing a particular user to input instructions to control the imaging device. In many embodiments, the ground segment 155 may include a graphical user interface (GUI) that facilitates user input of the instructions. Based on the user input, the payload device management 170 will determine what instructions should be sent to the airborne segment 105. It is the role of the payload management computer 115 to process the received user instructions into instructions that are recognizable to the particular imaging device 110. In this way, the feature of having one controller capable of communicating with a plurality of distinct imaging devices 110 is possible.

Figure 2:
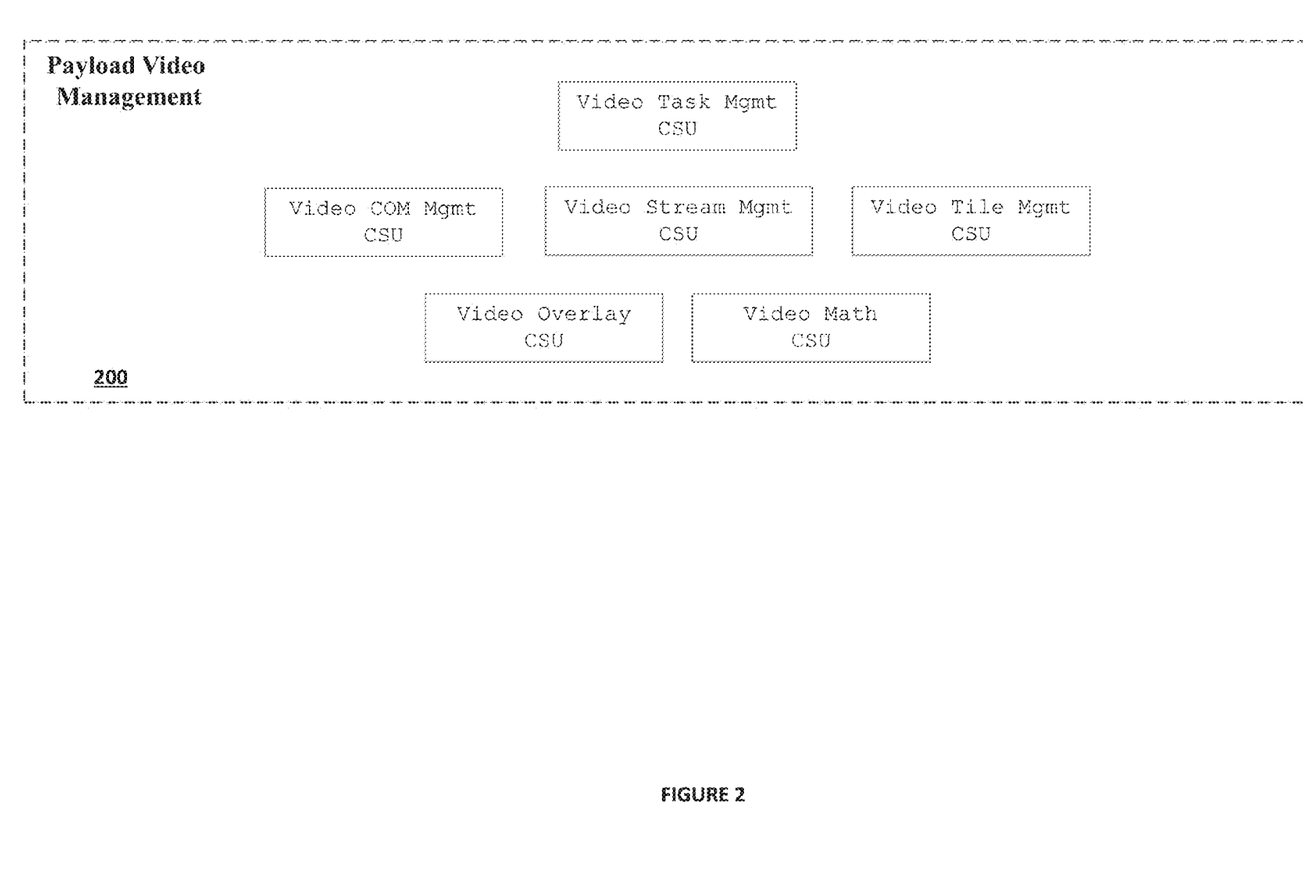
FIG. 2 illustrates a payload video management of a ground segment.

FIG. 2 illustrates a payload video management 200 of a ground segment. As described above, the payload video management 200 includes a variety of different applications/programs/libraries that can be used to facilitate a user using the ground segment with viewing and interacting with the images obtained by the imaging device(s) of the airborne segment. Exemplary features associated with the payload video management 200 include applications/programs/libraries associated with video task management, video COM management, video stream management, video tile management, video overlay and video math. These features may not only process the information pertaining to the images being transmitted from the airborne segment but also process the information to be displayed.

In some embodiments, the ground segment may have one or more displays. The displays may be used to display the images from the airborne segment. The payload video management 200 may be responsible for processing the images so that a user can view the images on the displays. The payload video management 200 may also provide display instructions on how the images are displayed on the display for the user to view. For example, a single display may include a plurality of different images or may include only one image based on the generated display instructions.

It should be noted that the features illustrated in FIG. 2 for the payload video management 200 are exemplary. More or less features may be possible in other embodiments. In fact, it would be within the teachings of the present application for the payload video management to be customizable based on the overall UDMS system. Based on, for example, the available imaging devices and displays, the features of the payload video management 200 may be adapted to best process and display the images for users to view.

Figure 3:
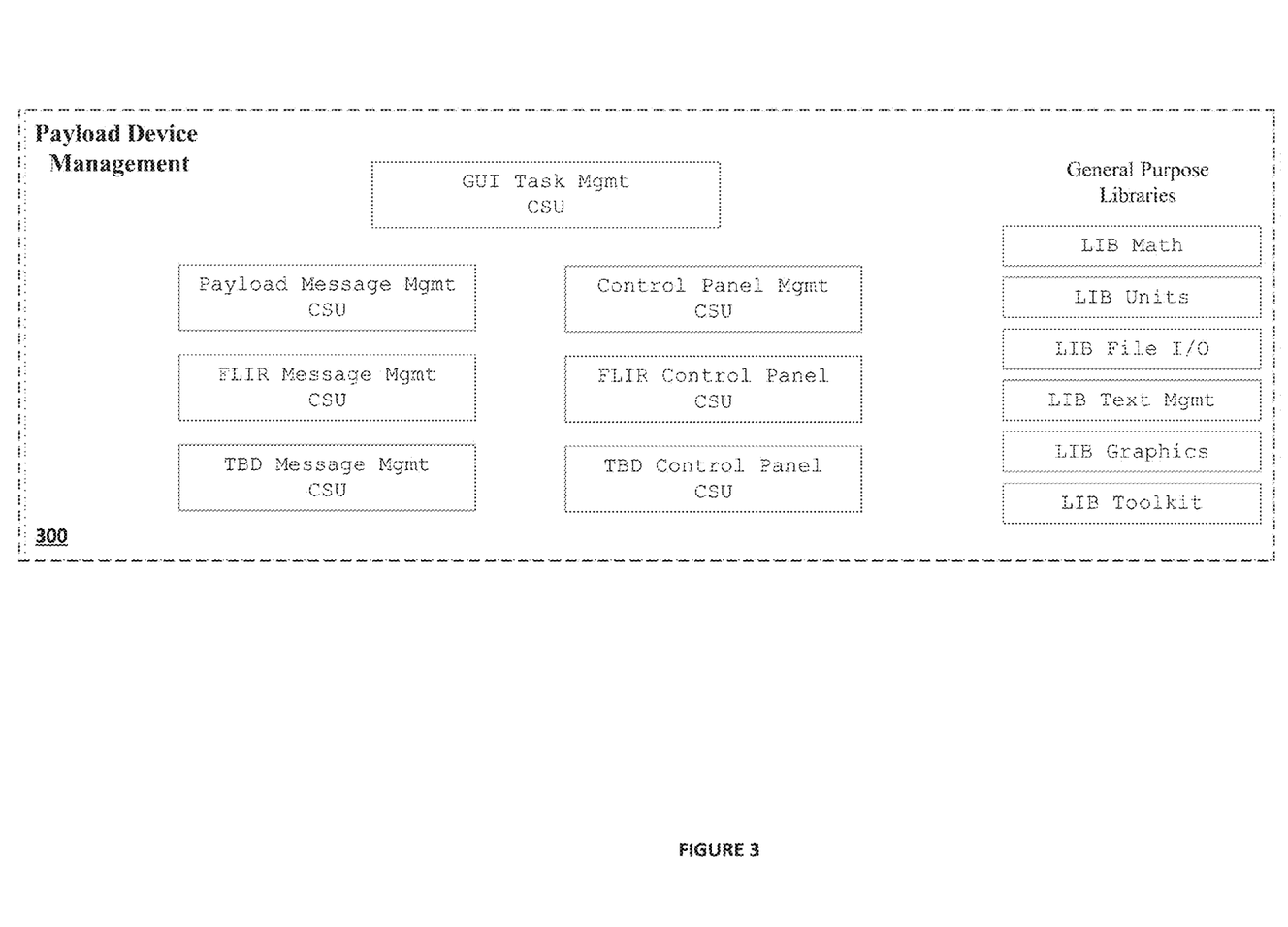
FIG. 3 illustrates a payload device management of a ground segment.

FIG. 3 illustrates a payload device management 300 of a ground segment. As described above, the payload device management 300 includes a variety of different applications/programs/libraries that can be used to facilitate a user control of the airborne segment and/or imaging device(s) associated with the airborne segment. Exemplary features associated with the payload device management 300 include applications/programs/libraries associated with GUI task management, message management and control panel management. These features may not only provide a way for a user to provide user input (e.g., via a GUI interface found on the ground segment) but also determine what instructions should be provided to the airborne segment based on the user input.

As illustrated below, the ground segment may include a plurality of different GUI used to receive user input. Based on how the user interacts with the GUI (e.g., selection of an option or button), the payload device management 300 can process the user interactions into corresponding instructions that are sent to the airborne segment.

Similar to the payload video management of FIG. 2, the features of the payload device management 300 of FIG. 3 are also customizable. It should be noted that the available programs, applications and libraries illustrated in payload device management are only provided as examples. Other types of programs, applications and libraries may also be available based on the overall UDMS system. For example, third parties may be able to create custom programs, applications and libraries (e.g., through the use of a Software Development Kit) to facilitate the use of a particular imaging device (e.g., a new imaging device not previously associated with the ground segment).

Figure 4:
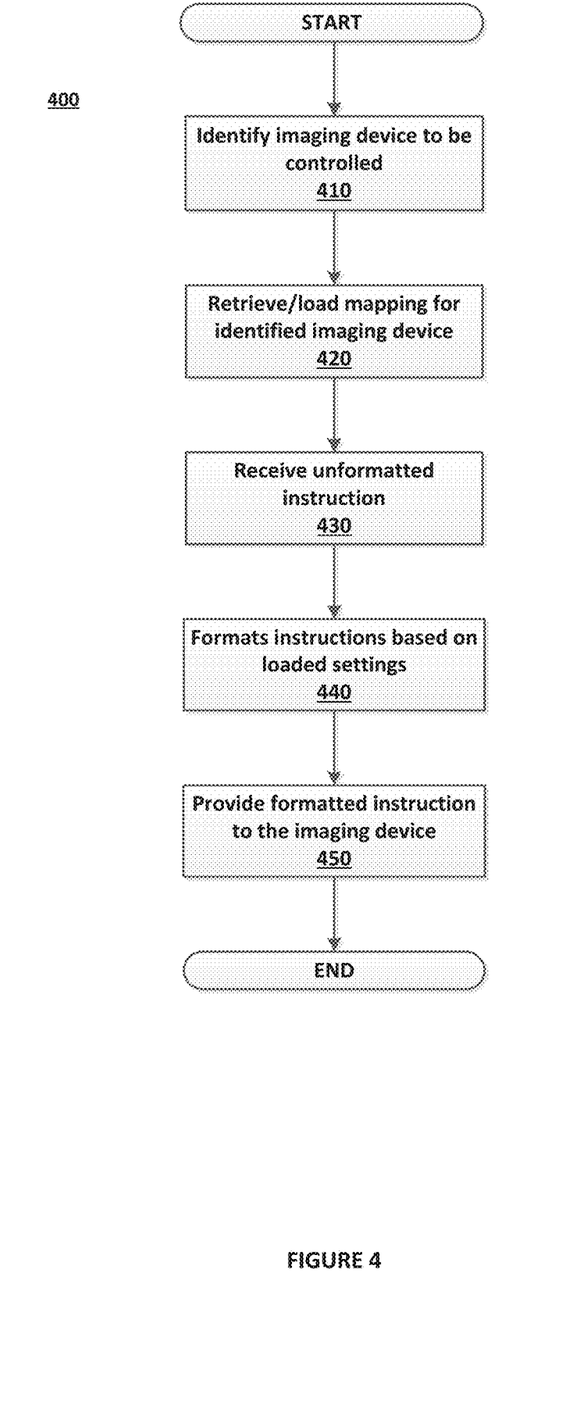
FIG. 4 illustrates a method for the payload management computer of the airborne segment.

FIG. 4 illustrates a method 400 for the payload management computer of an airborne segment. More specifically, the method 400 illustrates the steps of the payload management computer directed at processing the user instructions for controlling the imaging device. In other words, the payload management computer includes applications/programs/libraries for converting the user instructions transmitted from the ground segment into recognizable instructions that a particular imaging device recognizes. In this way, the payload management computer can be updated with new applications/programs/libraries so that additional/new imaging devices can also be utilized.

The method 400 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 4 (and the order thereof) are exemplary and may include various alternatives, equivalents, or derivations thereof including but not limited to the order of execution of the same.

In step 410, the imaging device to be controlled is identified. As noted above, the controller is capable of communicating to a plurality of different imaging device. Each imaging device, however, may be designed differently. In this way, each imaging device may respond to different types of instructions that would be unrecognizable to other imaging devices.

The payload management computer, as described herein, is capable of taking the instructions from the controller and processing them into instructions that would be recognizable by the appropriate imaging device. In order to provide the appropriate transformations, however, the payload management computer needs to be informed what imaging device is being used. In an embodiment, selection of a particular imaging device by a user associated with the controller may include providing the identity of the same imaging device to the payload management computer.

In step 420, the appropriate mappings/transformations are retrieved/loaded for use by the payload management computer. The payload management computer uses the mappings/transformations in order to process the instructions being transmitted from the ground segment into instructions that are recognized by the imaging device. The payload management computer may contain a plurality of different mappings/transformations for use for corresponding imaging devices. As new imaging devices are utilized, new mappings/transformations may be added for the payload management computer. The use of the mappings/transformations allows the same controller (e.g., ground segment) to be used for the various different imaging devices even though each imaging device operates differently from each other.

In step 430, the payload management computer receives instructions from the ground segment. These instructions received are considered unformatted because they may not correspond to instructions that are recognizable by the imaging device that the user wishes to control. The payload management computer, however, is capable of processing these instructions from the ground segment (i.e. unformatted instructions) into instructions that are recognized by the imaging device.

In step 440, the payload management computer processes the received instructions from the ground segment into instructions that are recognizable by the imaging device. The process utilizes the retrieved/loaded mapping to transform the user instructions into instructions that will carry out what the user intends using instructions the imaging device understands. The payload management computer may have all the various mappings stored in memory associated with the payload management computer. The memory may be updated to include new imaging devices and corresponding mappings.

In step 450, the payload management computer provides the processed instructions to the imaging device. In an embodiment, if such a transformation (as performed in step 440) is not possible (e.g., a mapping for a particular instruction is not available), the payload management computer may not forward the particular instruction to the imaging device. Furthermore, the payload managing computer may provide the user with an error message indicating that such an action is not possible.

It should be noted that the payload management computer may only be capable of communicating with only one imaging device at one time. For example, if the user is currently connected to imaging device A and would like to now provide instructions to imaging device B, the user would need to disconnect from imaging device A and start a connection to imaging device B. Once the connection with imaging device B is formed, step 410 is performed so that the payload management computer is informed of the identity of the imaging device (e.g., imaging device B) that will be used. The remaining steps (e.g., 420-450) of the overall method 400 would need to be performed so that the user instructions can be properly processed.

Figure 5:
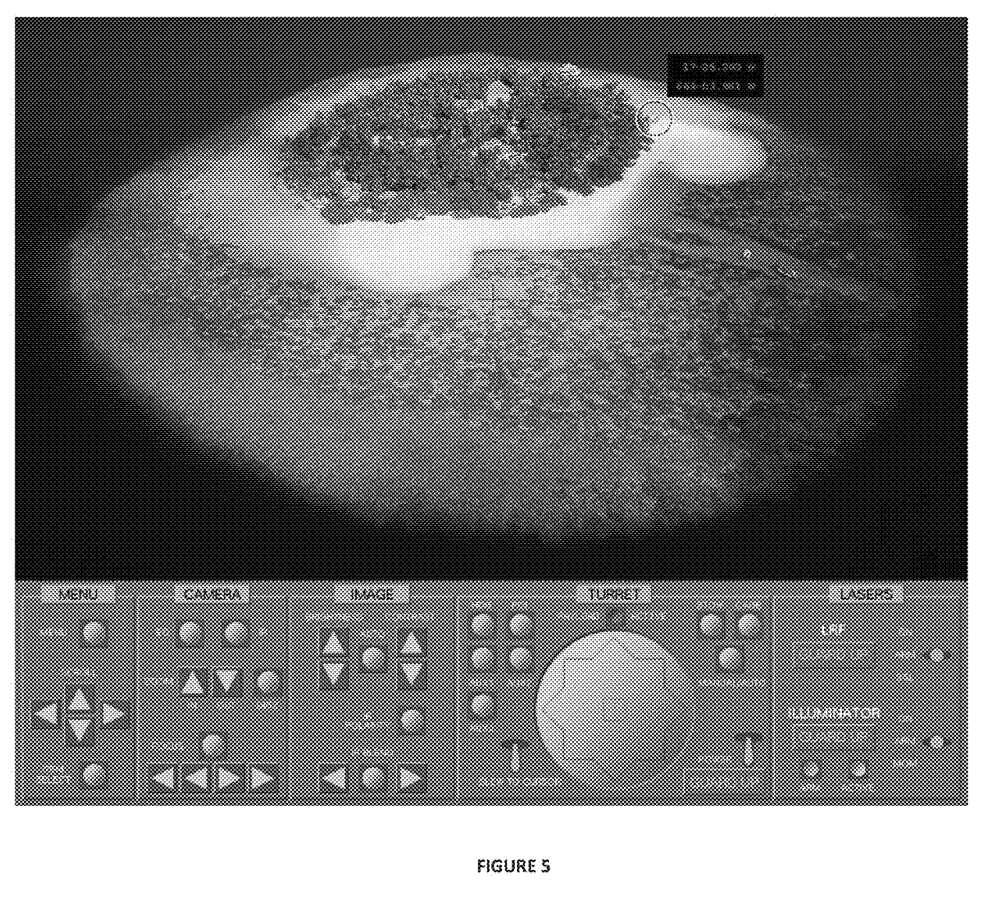
FIG. 5 illustrates an exemplary graphical user interface (GUI).
Figure 6:
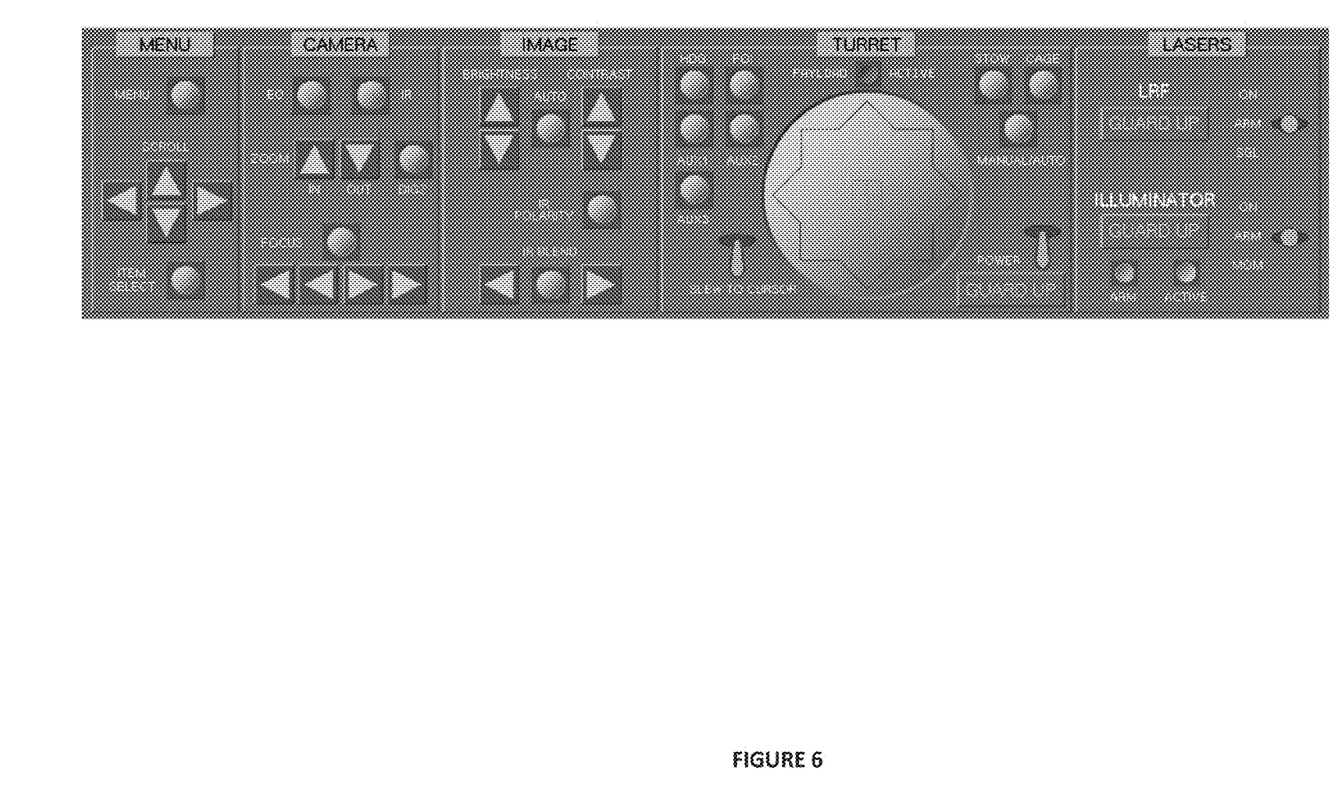

FIGS. 5-7 (in particular FIG. 7A-7D) illustrate exemplary graphical user interfaces (GUIs). More specifically, each of the figures illustrates different embodiments of the GUI that a user can interact with. In some embodiments, the user may interact with elements used to control the imaging device. In other embodiments, the user is capable of viewing the images being captured by the imaging device. In any case, each of the embodiments are within the teachings of the present application.

With reference to FIG. 5, a first exemplary GUI is illustrated. The GUI includes various interactive elements (e.g., buttons, dials, switches) that can be manipulated by a user in order to manage and control a particular imaging device.

In some cases, an imaging device may use different terminology and/or algorithms to perform similar functions. For example, whereas one manufacturer may utilize the functionalities of "cage" and "stow" as shown in the exemplary GUI, another manufacturer may utilize different terminology. In either case, a similar action/instruction is still intended for each respective imaging device even though different terms or algorithms are used. Someone without training for each specific imaging device may miss or be unaware of such differences. This lack of knowledge may prevent the user from being able to effectively operate the imaging devices.

As noted above, previous users would have needed training for each imaging device in order to understand the intricacies and differences between the features and functions of each imaging device. With the present invention, a standardized GUI is provided. Based on the corresponding imaging device, the payload management device can provide the instructions corresponding to the user inputs coming from the GUI. The instructions can then be transformed by the payload management computer into instructions that can be understood by the particular imaging device. Taking the example above, if the imaging device in question utilized the function "cage", the present invention would forward the equivalent instruction to the particular imaging device in the situation where a user would manipulate the "cage" and "stow" parameters. In other words, the payload management device forwards instructions associated with the GUI and the payload management computer transforms that particular signal into a recognizable instruction for the corresponding imaging device. In this way, a user would only need to be trained in using the GUI of the present invention since the intricacies and differences are handled by the payload management computer.

FIG. 6 illustrates further exemplary GUI. More specifically, the GUI shows different elements that a user can interact with in order to manage and control an imaging device. Other elements may also be organized different. The elements may also be displayed differently.

It should be noted that as new features are implemented into each imaging device or as more imaging devices become available for use, the GUI can adapt based on the need and uses of the various imaging devices that can be controlled by the present invention. The GUI can then be customized to incorporate those additional features as needed.

Figure 7A:
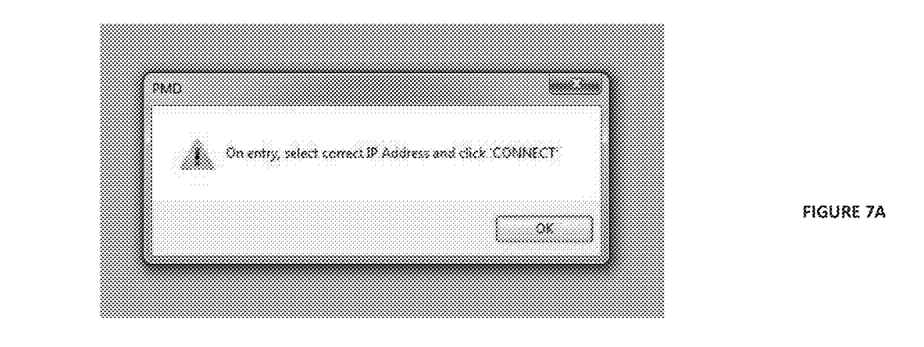
FIG. 7A illustrates further exemplary GUI, showing an initial message that instructs the user to select an IP address.

FIGS. 7A-7D illustrates further exemplary GUI. First, FIG. 7A illustrates an initial message that instructs the user to select an IP address. The IP address can be used as a communication channel for communication between the ground segment and the airborne segment.

Figure 7B:
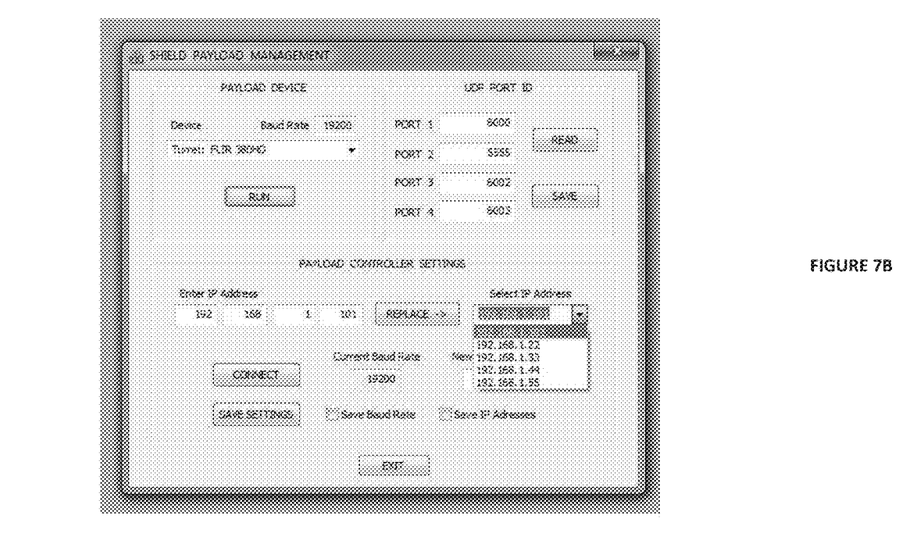
FIG. 7B illustrates an exemplary GUI that allows the user to select various settings in preparation for managing and controlling a particular imaging device.

FIG. 7B illustrates an exemplary GUI that allows the user to select various settings in preparation for managing and controlling a particular imaging device. In particular, the user using the GUI illustrated in FIG. 7B can be allowed to select the particular imaging device to manage and control under 'payload device.' The selection can be chosen from a plurality of existing imaging devices listed in a drop down menu.

Also included is the payload controller setting. Here, the user can identify the IP address that will be used to carry out the communication between the ground segment and the airborne segment. As illustrated in FIG. 7B, the IP address can be provided by the user via empty boxes. Alternatively, the user may be capable of selecting from one or more pre-set IP addressed listed in a drop down menu. Additional information via the UDP Port ID can also be provided to facilitate the communication between the ground and airborne segments.

Figure 7C:
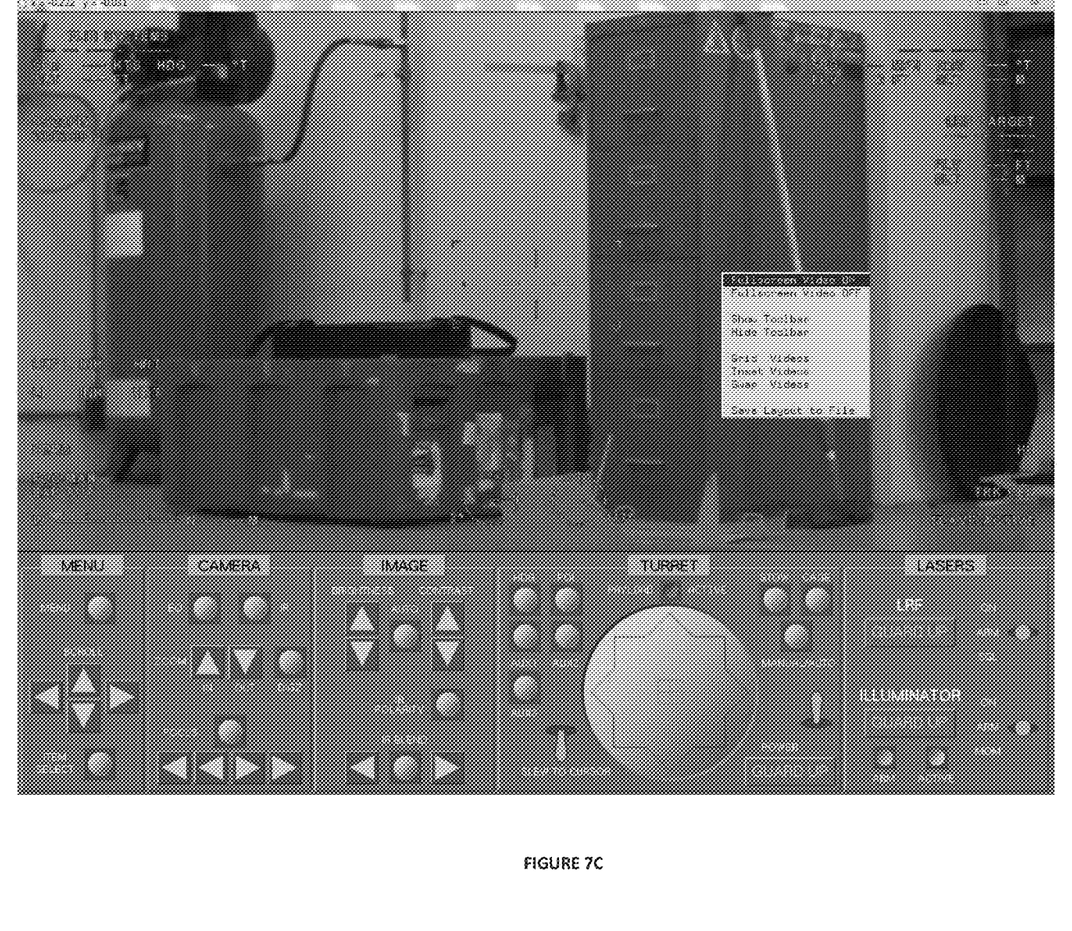
FIG. 7C illustrates an exemplary GUI displaying an image from the imaging device alongside the GUI for managing and controlling the imaging device.

FIG. 7C illustrates an exemplary GUI displaying an image from the imaging device alongside the GUI for managing and controlling the imaging device. As noted above, the ground segment may include one or more displays in which the exemplary GUI in FIG. 7C may be shown. A portion of the display may display the image that is captured from the imaging device. The remaining portion of the display may display the GUI used to manage and control the imaging device. In this way, the user controlling the imaging device may be capable of viewing the effects of the user input being entered into the GUI. For example, if the user instructs the imaging device to 'zoom in,' the image displayed will eventually display an updated captured image from the imaging device that shows a zoomed in portion of what was previously shown. In this way, a user can adjust the control of the imaging device based on what is displayed in real time.

Figure 7D:
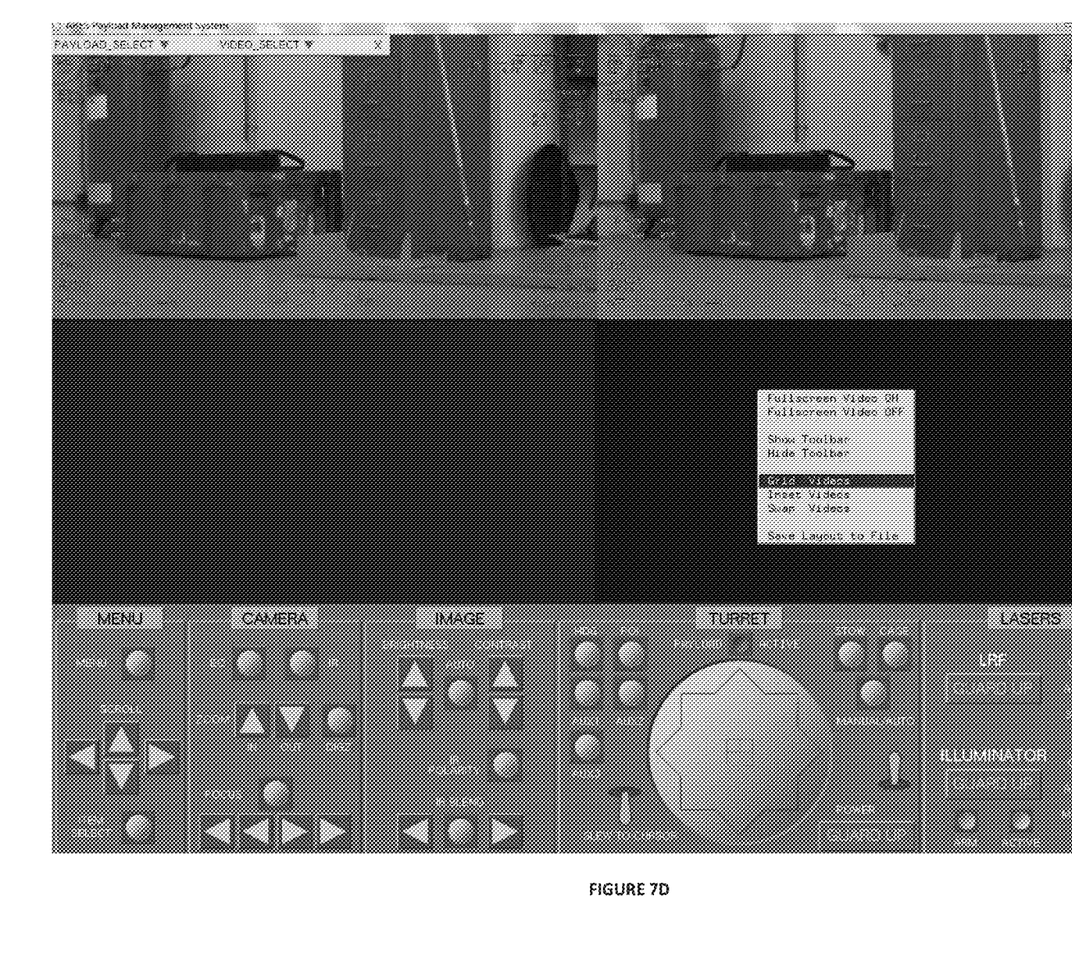
FIG. 7D illustrates an exemplary GUI similar to FIG. 7C except that the display showing the image captured by the imaging device may be split up into four sections.

FIG. 7D illustrates an exemplary GUI similar to FIG. 7C except that the display showing the image captured by the imaging device may be split up into four sections. Each of the four sections may be used to display different images. These images may be from different periods of time. In another embodiment, these images may come from different sources (e.g., the forward camera of the airborne segment, other imaging devices).

It should be noted that the present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for universal device management of a plurality of imaging devices, the method comprising:
storing information regarding a plurality of imaging devices in memory associated with a processor, wherein the stored information regarding each imaging devices includes a set of operational settings specific to one of the plurality of different imaging devices;

receiving, at the processor, an unformatted instruction sent over a wireless communication network from a controller regarding a particular imaging device, wherein the unformatted instructions from the controller is directed at managing or controlling the imaging device, wherein the identified imaging device uses a payload format for serial communications, and wherein the payload format specific to the identified imaging device is different from respective payload formats of other imaging devices;

executing instructions stored in the memory, wherein execution of the instructions by a processor:
identifies the specific imaging device that is being referenced by the unformatted instructions coming from the controller,
retrieves the set of operational settings associated with the identified imaging device,
loads the retrieved set of operational settings, and
formats the received instruction from the controller in accordance with the retrieved set of operational settings, wherein formatted instruction conforms to the specific payload format for serial communications with the identified imaging device; and
providing the formatted instruction to the identified imaging device, wherein the formatted instructions manages or controls the imaging device based on the instructions provided by the controller.

2. The method of claim 1, wherein the stored information in memory associated with the processor regarding the plurality of imaging devices is updated when additional or newer imaging devices are used.

3. The method of claim 1, wherein the method is performed by the processor for unformatted instructions coming from one controller to control a first imaging device.

4. The method of claim 3, wherein the processor disconnects from the first imaging device in order to perform the method for a different second imaging device.

5. A system for universal device management of a plurality of imaging devices, the system comprising:
one or more different imaging devices, wherein each imaging device has a distinct payload format different from payload formats of other imaging devices;
a controller where a user provides user input for managing or controlling an imaging device; and
a processor that includes memory that stores information regarding a plurality of imaging devices, wherein the stored information regarding each imaging devices includes a set of operational settings specific to one of the plurality of different imaging devices, wherein the processor receives unformatted instruction sent over a wireless communication network from a controller regarding a particular imaging device, wherein the unformatted instructions from the controller is directed at managing or controlling the imaging device, wherein the identified imaging device uses a payload format for serial communications, and wherein the payload format specific to the identified imaging device is different from respective payload formats of other imaging devices, and wherein the processor executes instructions stored in memory to:
identify the specific imaging device that is being referenced by the unformatted instructions coming from the controller,
retrieve the set of operational settings associated with the identified imaging device,
load the retrieved set of operational settings,
format the received instruction from the controller in accordance with the retrieved set of operational settings, wherein formatted instruction conforms to the specific payload format for serial communications with the identified imaging device; and
provide the formatted instruction to the identified imaging device, wherein the formatted instructions manages or controls the imaging device based on the instructions provided by the controller.

6. The system of claim 4, wherein the stored information in memory associated with the processor regarding the plurality of imaging devices is updated when additional or newer imaging devices are used.

7. The system of claim 4, wherein the processor executes the instructions for the unformatted instructions coming from one controller to control a first imaging device.

8. The system of claim 7, wherein the processor disconnects from the first imaging device in order to execute the instructions for a different second imaging device.

9. A non-transitory computer-readable storage medium, having embodied thereon a program executable by a processor to perform a method for universal device management of a plurality of imaging devices, the method comprising:
storing information regarding a plurality of imaging devices in memory associated with a processor, wherein the stored information regarding each imaging devices includes a set of operational settings specific to one of the plurality of different imaging devices;
receiving, at the processor, an unformatted instruction sent over a wireless communication network from a controller regarding a particular imaging device, wherein the unformatted instructions from the controller is directed at managing or controlling the imaging device, wherein the identified imaging device uses a payload format for serial communications, and wherein the payload format specific to the identified imaging device is different from respective payload formats of other imaging devices;
executing instructions stored in the memory, wherein execution of the instructions by a processor:
identifies the specific imaging device that is being referenced by the unformatted instructions coming from the controller,
retrieves the set of operational settings associated with the identified imaging device,
loads the retrieved set of operational settings, and
formats the received instruction from the controller in accordance with the retrieved set of operational settings, wherein formatted instruction conforms to the specific payload format for serial communications with the identified imaging device; and
providing the formatted instruction to the identified imaging device, wherein the formatted instructions manages or controls the imaging device based on the instructions provided by the controller.

10. The non-transitory computer-readable storage medium of claim 9, wherein the stored information in memory associated with the processor regarding the plurality of imaging devices is updated when additional or newer imaging devices are used.

11. The non-transitory computer-readable storage medium of claim 9, wherein the method is performed by the processor for unformatted instructions coming from one controller to control a first imaging device.

12. The non-transitory computer-readable storage medium of claim 11, wherein the processor disconnects from the first imaging device in order to perform the method for a different second imaging device.

* * * * *